(12) United States Patent
Lior (10) Patent No.: US 11,725,579 B2
(45) Date of Patent: Aug. 15, 2023

(54) COOLING SYSTEM FOR RECUPERATED GAS TURBINE ENGINES

(71) Applicant: Turbogen Ltd., Ramat Gan (IL)

(72) Inventor: David Lior, Herzliya (IL)

(73) Assignee: TURBOGEN LTD., Ramat Gan (IL)

( * ) Notice: Subject to any disclaimer, the term of this patent is extended or adjusted under 35 U.S.C. 154(b) by 0 days.

(21) Appl. No.: 17/430,347

(22) PCT Filed: Feb. 12, 2020

(86) PCT No.: PCT/IB2020/051130
§ 371 (c)(1),
(2) Date: Aug. 12, 2021

(87) PCT Pub. No.: WO2020/165790
PCT Pub. Date: Aug. 20, 2020

(65) Prior Publication Data
US 2022/0128002 A1  Apr. 28, 2022

Related U.S. Application Data

(60) Provisional application No. 62/804,779, filed on Feb. 13, 2019.

(51) Int. Cl.
*F02C 6/08* (2006.01)
*F02C 7/10* (2006.01)
*F02C 7/18* (2006.01)
*F02C 7/08* (2006.01)
(Continued)

(52) U.S. Cl.
CPC ............... *F02C 6/08* (2013.01); *F01D 9/023* (2013.01); *F01D 9/026* (2013.01); *F02C 7/08* (2013.01); *F02C 7/10* (2013.01); *F02C 7/18* (2013.01); *F02C 9/18* (2013.01)

(58) Field of Classification Search
CPC ...... F02C 6/08; F02C 7/08; F02C 7/10; F02C 7/18; F02C 9/18; F01D 9/023; F01D 9/026; F01D 25/12; F05D 2270/20; F05D 2270/3061; F05D 2270/3062
See application file for complete search history.

(56) References Cited

U.S. PATENT DOCUMENTS

| 3,849,022 A | * | 11/1974 | Amann | F01D 11/08 415/117 |
| 3,866,674 A | * | 2/1975 | Tramuta | F28D 9/0031 165/145 |
| 3,936,223 A | * | 2/1976 | Baghdadi | F04D 21/00 415/208.4 |

* cited by examiner

*Primary Examiner* — Gerald L Sung
*Assistant Examiner* — Rene D Ford
(74) *Attorney, Agent, or Firm* — Mark M. Friedman (57) ABSTRACT

A cooling system for cooling hot components of a radial or axial gas turbine engine, which includes a recuperator heat exchanger, provides engine cooling without loss of thermal efficiency. Air flow leaving a compressor is split between a recuperator flow path and a bleed flow path. Air in the bleed flow path flows through the hot parts of the engine, thereby cooling the engine and heating the air. The air in the bleed flow path is combined with the output flow from a combustor and directed into a turbine inlet. A reduction of air flow in the recuperator flow path increases the thermal effectiveness of the recuperator heat exchanger by increasing a ratio of hot and cold flows inside the heat exchanger. The increase in thermal effectiveness of the heat exchanger compensates for energy losses incurred by diverting a portion of the compressor air flow for cooling.

8 Claims, 8 Drawing Sheets

(51) Int. Cl.
*F02C 9/18* (2006.01)
*F01D 9/02* (2006.01)

| Station | W kg/s | T K | P kPa | WRstd kg/s | | | |
|---|---|---|---|---|---|---|---|
| amb | | 288.00 | 101.350 | | PWSD | = | 40.0 kW |
| 1 | 0.307 | 288.00 | 101.350 | | | | |
| 2 | 0.307 | 288.00 | 99.323 | 0.314 | PSFC | = | 0.2059 kg/(kW*h) |
| 3 | 0.298 | 420.73 | 293.003 | 0.125 | Heat Rate= | | 10242.0 kJ/(kW*h) |
| 31 | 0.298 | 420.73 | 293.003 | | Therm Eff= | | 0.3515  ← Cycle Thermal Efficiency |
| 35 | 0.267 | 978.99 | 288.608 | | WF | = | 0.00229 kg/s |
| 4 | 0.270 | 310.00 | 277.063 | 0.211 | P35/P3 | = | 0.98500 |
|   |       | ↑ Combustor outlet temperature |  |  |  |  |  |
| 41 | 0.300 | 1277.43 | 277.063 | 0.232 | P7/P6 | = | 0.98000 |
| 49 | 0.300 | 1051.59 | 106.230 | | s NOx | = | 0.96085 |
| 5 | 0.300 | 1051.59 | 106.230 | 0.550 | incidence= | | 0.00000 ° |
| 6 | 0.300 | 1051.59 | 105.487 | | XM8 | = | -0.9556 |
| 7 | 0.300 | 516.59 | 103.377 | | A8 | = | 5.573E-4 m² |
| 8 | 0.300 | 516.59 | 103.377 | 0.396 | P8/Ps8 | = | 0.50495 |
| Bleed | 0.003 | 288.00 | 99.323 | | WBld/W2 | = | 0.03000 |
| | | | | | P2/P1 | = | 0.98000 |
| Ps0-P2= | 2.027 | Ps8-Ps0= | 103.377 | | Ps0 | = | 204.727 kPa |
| Efficiencies: | isentr | polytr | RNI | P/P | W_NGV/W2 | = | 0.10000 |
| Compressor | 0.7800 | 0.8103 | 0.981 | 2.950 | WCL/W2 | = | 0.00000 |
| Burner | 0.9900 | | | 0.960 | Loading | = | 100.00 % |
| Turbine | 0.8550 | 0.8387 | 0.479 | 2.608 | e45 th | = | 0.85232 |
| Heat Exch | 0.8800 | | | | | | |
|   |  ↑ HX Thermal Effectiveness  |   |   |   |   |   |   |
| Generator | 0.0000 | | | | PW_gen | = | 0.0 kW |
| Spool mech Eff | 0.9850 | Nom Spd | 0 rpm | | P6/P5 | = | 0.9930 |

| hum [%] | war0 | FHV | Fuel |
|---|---|---|---|
| 60.0 | 0.00644 | 49.736 | Natural Gas |

| Station | W kg/s | T K | P kPa | WRstd kg/s | | | |
|---|---|---|---|---|---|---|---|
| amb | | 288.15 | 101.325 | | | | |
| 1 | 0.312 | 288.15 | 101.325 | | PWSD | = | 39.7 kW |
| 2 | 0.312 | 288.15 | 100.818 | 0.314 | | | |
| 3 | 0.312 | 420.95 | 297.414 | 0.129 | PSFC | = | 0.1988 kg/(kW*h) |
| 31 | 0.302 | 420.95 | 297.414 | | Heat Rate= | | 9885.6 kJ/(kW*h) |
| 25 | 0.240 | 997.90 | 292.953 | | Therm Eff= | | 0.3642 |
| 4 | 0.242 | 1248.00 | 278.305 | 0.192 | WF | = | 0.00219 kg/s |
| 41 | 0.305 | 1279.00 | 278.305 | 0.235 | P35/P3 | = | 0.98500 |
| 49 | 0.305 | 1051.74 | 106.204 | | P7/P6 | = | 0.98000 |
| 5 | 0.305 | 1051.74 | 106.204 | 0.558 | s NOx | = | 1.06548 |
| 6 | 0.305 | 1051.74 | 105.461 | | incidence= | | 0.00000 ° |
| 7 | 0.305 | 495.98 | 103.351 | | XM8 | = | 0.1696 |
| 8 | 0.305 | 495.98 | 103.351 | 0.394 | A8 | = | 0.0057 m² |
| Bleed | 0.009 | 420.95 | 297.414 | | | | |
| | | | | | P8/Ps8 | = | 1.02000 |
| | | | | | WB1d/W2 | = | 0.03000 |
| | | | | | P2/P1 | = | 0.99500 |

| Efficiencies: | isentr | polytr | RNI | P/P |
|---|---|---|---|---|
| Compressor | 0.7800 | 0.8103 | 0.995 | 2.950 |
| Burner | 0.9900 | | 0.950 | |
| Turbine | 0.8550 | 0.8396 | 0.480 | 2.620 |
| Heat Exch. | 0.9100 | | | |
| Generator | 1.0000 | | | |

W_NGV/W2 = 0.20000
WCL/W2 = 0.00000
Loading = 100.00 %
e45_th = 0.84832

PW_gen = 39.7 kW

P6/P5 = 0.9930

| Spool mech Eff | Nom Spd | | Fuel |
|---|---|---|---|
| 0.9850 | 80000 rpm | | |

| hum [%] | mar0 | PHV | Fuel |
|---|---|---|---|
| 60.0 | 0.00637 | 49.736 | Natural Gas |

Annotations:
- Combustor outlet temperature (pointing to 1248.00)
- Cycle Thermal Efficiency (pointing to 0.3642)
- Heat Exchanger Thermal Efficiency (pointing to 0.9100)

| Station | W kg/s | T K | P kPa | WRstd kg/s |
|---|---|---|---|---|
| amb | | 288.15 | 101.325 | |
| 1 | 0.312 | 288.15 | 101.325 | |
| 2 | 0.312 | 288.15 | 100.818 | 0.314 |
| 3 | 0.312 | 420.95 | 297.414 | 0.129 |
| 31 | 0.302 | 420.95 | 297.414 | |
| 35 | 0.209 | 996.33 | 292.953 | |
| 4 | 0.211 | 1395.00 | 278.305 | 0.170 |
| 41 | 0.305 | 1277.02 | 278.305 | |
| 49 | 0.305 | 1050.06 | 106.204 | 0.235 |
| 5 | 0.305 | 1050.06 | 106.204 | |
| 6 | 0.305 | 1050.06 | 105.461 | 0.557 |
| 7 | 0.305 | 495.76 | 103.351 | |
| 8 | 0.305 | 495.76 | 103.351 | 0.394 |
| Bleed | 0.009 | 420.95 | 297.414 | |

Combustor outlet temperature (circled: 1395.00)

| Efficiencies: | isentr | polytr | RMI | P/P |
|---|---|---|---|---|
| Compressor | 0.7800 | 0.8103 | 0.995 | 2.950 |
| Burner | | 0.9900 | | 0.950 |
| Turbine | 0.8550 | 0.8396 | 0.481 | 2.620 |
| Heat Exch. | 0.9100 | | | |
| Generator | 1.0000 | | | |

HX Thermal Effectiveness (circled: 0.9100)

Spool mech Eff 0.9850    Nom Spd 80000 rpm

| hum [%] | war0 | FHV | Fuel |
|---|---|---|---|
| 60.0 | 0.00637 | 49.736 | Natural Gas |

| | | |
|---|---|---|
| FWSD | = | 39.6 kW |
| PSFC | = | 0.1992 kg/(kW*h) |
| Heat Rate= | | 9907.2 kJ/(kW*h) |
| Therm Eff= | | 0.3634 |
| WF | = | 0.00219 kg/s |
| P35/P3 | = | 0.98500 |
| P7/P6 | = | 0.98000 |
| s_NOx | = | 1.05692 |
| incidence= | | 0.00000 ° |
| XM8 | = | 0.1696 |
| A8 | = | 0.0057 m² |
| P8/Ps8 | = | 1.02000 |
| WBld/W2 | = | 0.03000 |
| P2/P1 | = | 0.99500 |
| W_NGV/W2 | = | 0.30000 |
| WCL/W2 | = | 0.00000 |
| Loading | = | 100.00 % |
| e45_th | = | 0.84531 |
| PW_gen | = | 39.6 kW |
| P6/P5 | = | 0.9930 |

Cycle thermal Efficiency (circled: 0.3634)

COOLING SYSTEM FOR RECUPERATED GAS TURBINE ENGINES

CROSS-REFERENCE TO RELATED APPLICATIONS

This application claims the benefit of U.S. provisional patent application Ser. No. 62/804,779, filed Feb. 13, 2019, by the present inventors which is incorporated by reference in its entirety herein.

FIELD OF THE INVENTION

The invention relates to cooling systems for axial and radial gas turbine engines having a recuperator.

BACKGROUND

In the design of gas turbines, cooling of hot engine parts is essential to reduce thermal stresses and deformations, which shorten turbine lifetime. Typically, the flow of air from an air compressor is used to cool critical engine parts, such as turbine blades, turbine discs, and the walls of an internal combustion chamber, or combustor. The energy loss due to a reduction in pressure and temperature of the air flow can reach up to 15% of the energy output of an uncooled gas turbine.

Cooling the outside of the engine with air flow or with external fluid also causes a loss of energy due to energy consumption by pumps or fans. An alternative solution, involving isolating the engine surface from the outside, has the undesired effect of causing thermal stress and distortions that may damage mechanical and geometric integrity, lower safety margins, and reduce turbine lifetime.

SUMMARY OF THE INVENTION

A cooling system for cooling a radial or axial gas turbine engine, with a recuperator heat exchanger, provides engine cooling without loss of thermal efficiency. Air flow leaving a compressor is split between a recuperator flow path and a bleed flow path. Air in the bleed flow path flows through hot parts of the engine, thereby cooling the engine and heating the air. The air in the bleed flow path is combined with the output flow from a combustor and directed into a turbine inlet. A reduction of air flow in the recuperator flow path increases the thermal effectiveness of the recuperator heat exchanger by increasing a ratio of hot and cold flows inside the heat exchanger. The increase in thermal effectiveness of the heat exchanger compensates for energy losses incurred by diverting a portion of the compressor air flow for cooling.

In the invention, a cooling system for cooling hot components of a radial or axial gas turbine engine includes a compressor having a compressor outlet, a turbine having a turbine inlet and a turbine outlet, a recuperator heat exchanger, a recuperator flow path, and a bleed flow path. In the recuperator flow path, air flows from the compressor outlet to the recuperator heat exchanger. In the bleed flow path, air flows from the compressor outlet to hot components of the recuperated gas turbine engine and to the turbine inlet. A bleed fraction, which is greater than or equal to zero and less than or equal to one, is equal to the ratio of a mass flow in the bleed flow path to a mass flow in the compressor outlet.

According to one feature of the cooling system of the invention, a mass flow in the recuperator flow path is approximately equal to the mass flow in the compressor outlet minus the mass flow in the bleed flow path.

According to another feature of the cooling system of the invention, the bleed fraction is less than or equal to one-half.

According to yet another feature of the cooling system of the invention, the compressor outlet includes a diffuser.

According to a further feature of the invention, the cooling system includes a combustor. Air flows from the recuperator heat exchanger into the combustor and from the combustor to the hot components of the recuperated gas turbine engine and the bleed flow path.

According to another feature of the cooling system of the invention, the recuperator heat exchanger is a cross-flow heat exchanger.

According to yet another feature of the cooling system of the invention, a thermal effectiveness of the recuperator heat exchanger increases with increasing values of the bleed fraction.

According to a further feature of the cooling system of the invention, the hot components of the recuperated gas turbine engine include a turbine volute.

According to another feature of the cooling system of the invention, the turbine volute includes a cooling insert through which air in the bleed flow path passes.

According to a further feature of the cooling system of the invention, the cooling insert includes a gap having a width of between 0.5 mm. and 2.0 mm. through which air in the bleed flow path passes.

BRIEF DESCRIPTION OF THE DRAWINGS

The invention is described herein, by way of example only, with reference to the accompanying drawings, wherein.

DETAILED DESCRIPTION

Figure 1:
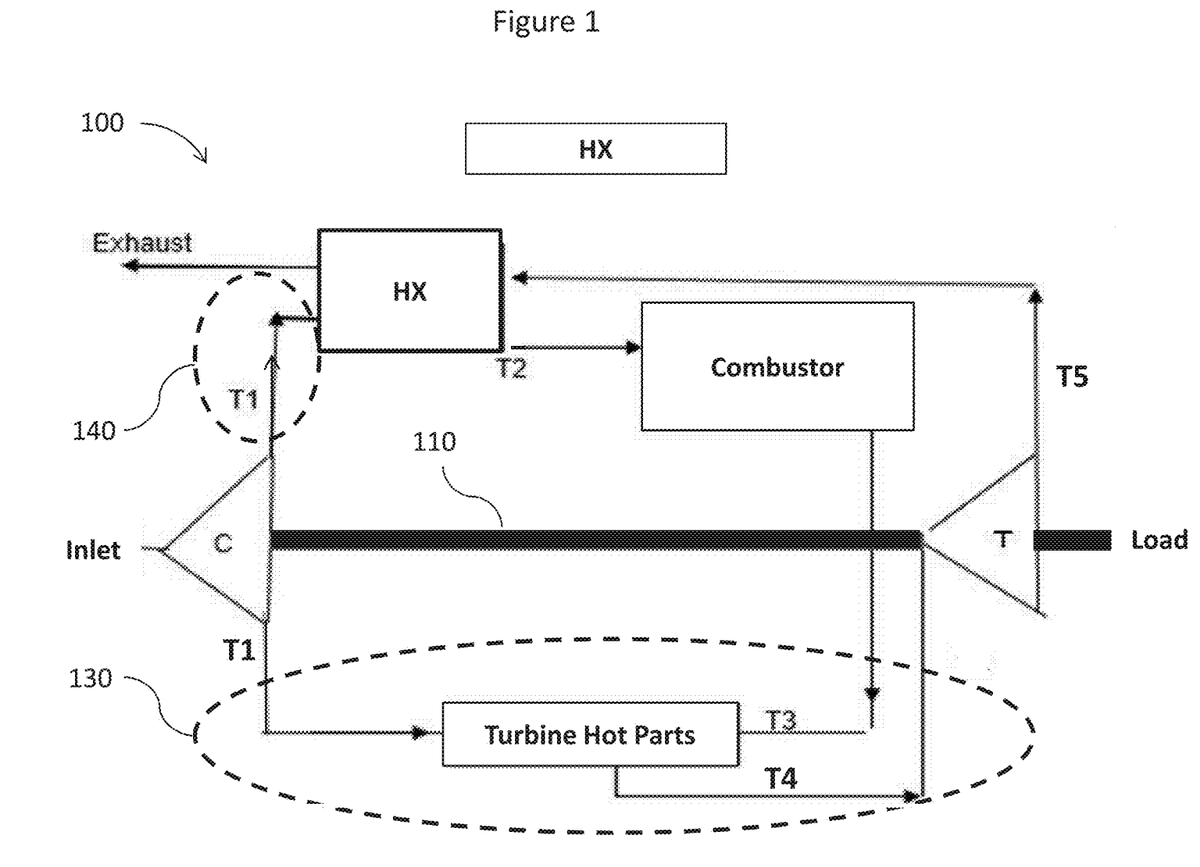
FIG. 1: A cycle flow diagram for a gas turbine, according to an embodiment of the invention.

FIG. 1 shows a cycle flow diagram for a gas turbine 100, according to an embodiment of the invention. Turbo-shaft 110 mechanically links compressor C to turbine T and to a load. Air leaving compressor C, at temperature T1, is split into a bleed path 130 and a recuperator path 140.

A bleed fraction, denoted by $m_0$, is defined as the ratio of the mass flow in the bleed path to the total mass flow from the compressor output. The value of $m_0$ is typically greater than or equal to zero and less than or equal one. In an exemplary embodiment of the invention, the bleed fraction is 0.3. The air flowing in the bleed path increases in temperature from T1 to T4 as it flows around hot components of the turbine engine. The bleed air flow is combined with the output flow of the combustor at temperature T3, and the combined flow arrives at the inlet of turbine T with a temperature T4 which is typically slightly less than T3.

In recuperator path 140, air flows from an outlet of compressor C into a recuperator heat exchanger (HX). The outlet of the compressor may be a diffuser. The mass flow in the recuperator flow path 140 is approximately equal to the mass flow in the compressor outlet minus the mass flow in the bleed flow path. Thus, the mass flow in path 140 is approximately equal to $(1-m_0)$ multiplied by the mass flow from the compressor outlet. The air flow leaving the recuperator and entering the combustor has a temperature T2, which is greater than T1. On leaving the combustor, the air flow temperature is further increased to T3.

Exhaust air from the turbine T, at temperature T5, is used to increase the efficiency of the recuperator heat exchanger HX, before being released to the ambient environment.

Figure 2A:
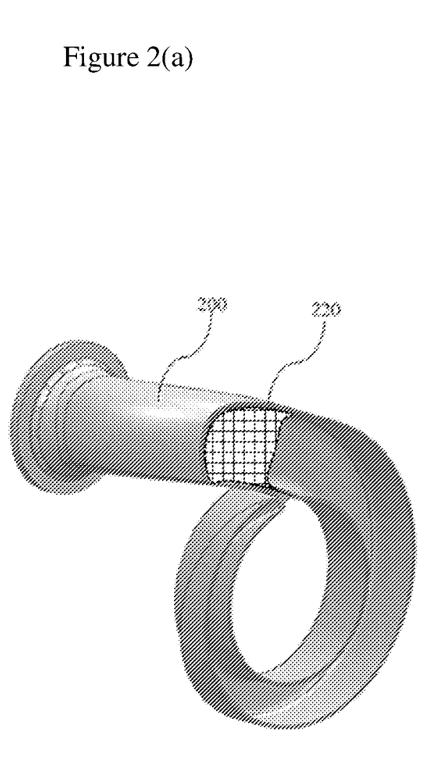
FIGS. 2(a) and 2(b): Perspective drawings of a turbine volute with a cooling insert, according to an embodiment of the invention.
Figure 2B:
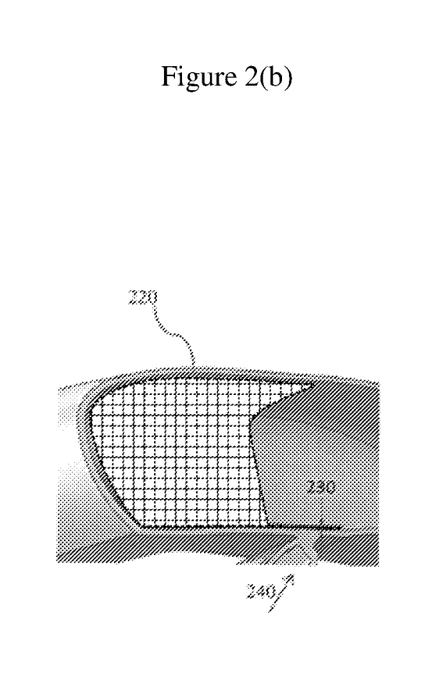

FIG. 2(a) is a perspective drawing of a turbine volute 200 with a cooling insert 220, according to an embodiment of the invention. Details of the cooling insert 220 are shown in FIG. 2(b). Arrow 240 shows the direction of cooling air flow, entering volute 200 through a gap 230 having a width typically in a range of 0.5 to 2.0 millimeters (mm).

The following thermodynamic equation relates the value of temperature T3 to the values of temperatures T1 and T4:

$$m_0*[Cp(T4)*T4-Cp(T1)*T1]=(1-m_0)*[Cp(T3)*T3-Cp(T4)*T4] \quad \text{Eqn. (1)}$$

All temperatures are in units of degrees Kelvin (° K) and Cp(T) denotes the specific heat of air at constant pressure and temperature T, in units of Joule per kilogram per ° K.

The thermal energy Q required to heat air from temperature T2 to T3 in the combustion chamber is given by:

$$Q=(1-m_0)*[Cp(T3)*T3-Cp(T2)*T2] \quad \text{Eqn. (2)}$$

The thermal effectiveness of a cross-flow recuperator heat exchanger, Eff, is given by:

$$\text{Eff}=(T2-T1)/(T5-T1) \quad \text{Eqn. (3)}$$

Figure 3:
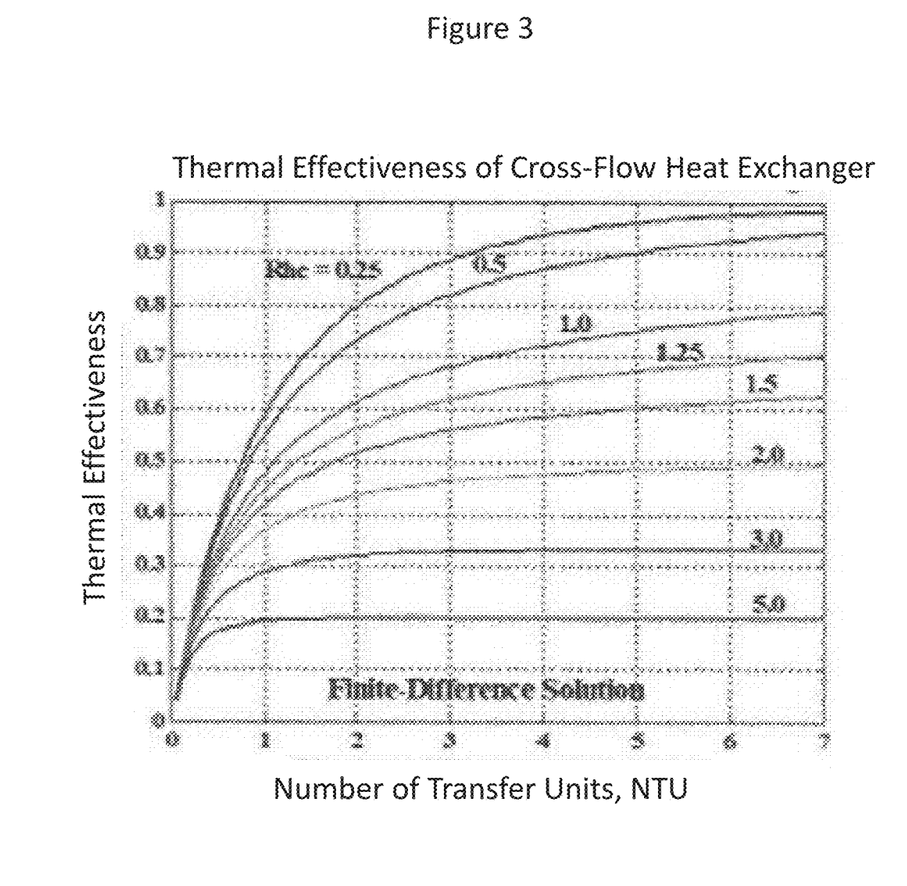
FIG. 3: A graph showing thermal effectiveness of a cross-flow recuperator heat exchanger.

The value of Eff also depends on the hot-to-cold flow ratio, denoted by Rhc, and on the number of transfer units, NTU. FIG. 3 shows an exemplary graph of Eff versus NTU, for various ratios Rhc. Note that Eff increases with increasing NTU and with decreasing Rhc.

Figure 4:
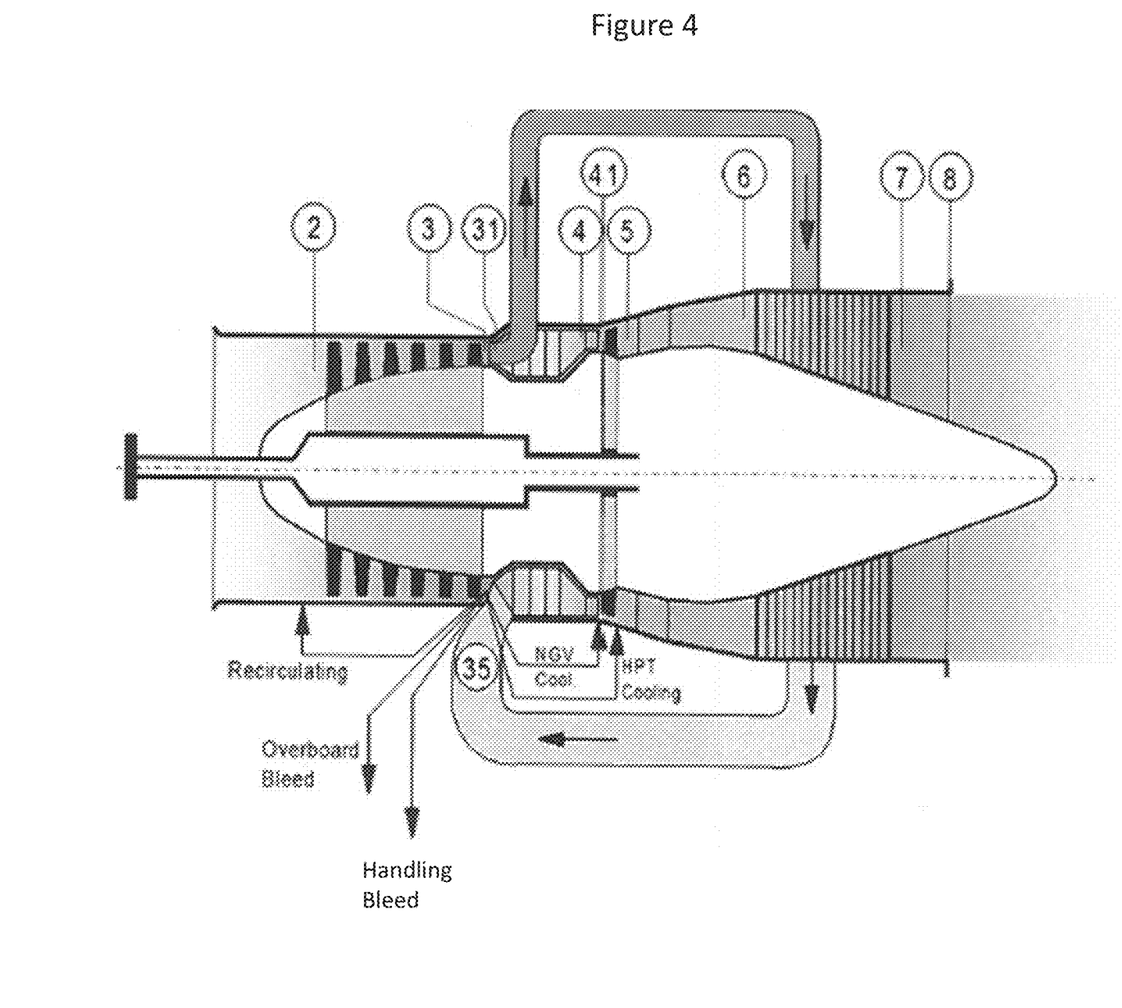
FIG. 4: A schematic diagram showing gas turbine station points used in thermodynamic calculations.
Figure 5:
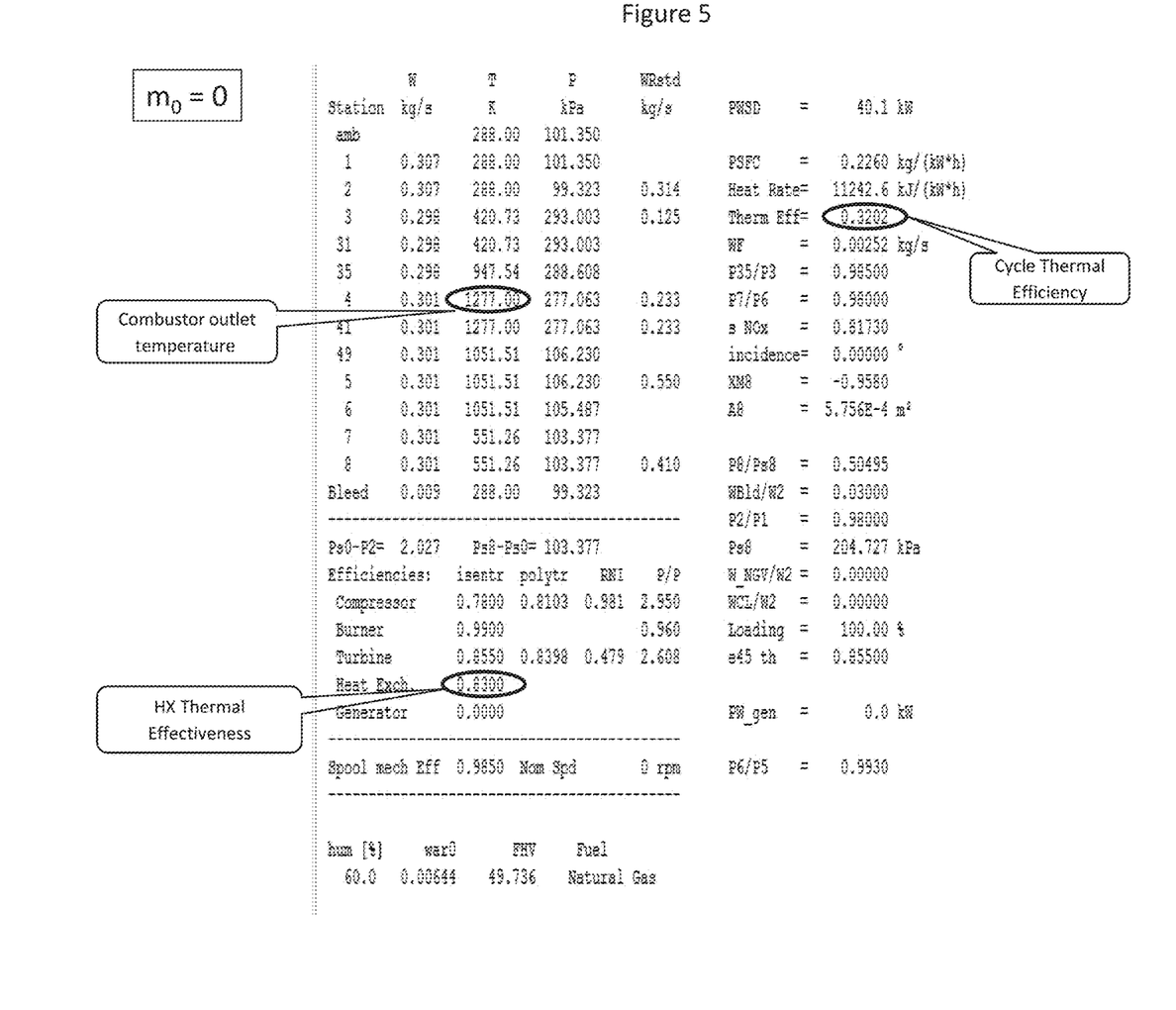
FIG. 5: Thermodynamic results for an exemplary 40 kW gas turbine with a bleed fraction of zero.
Figure 6:
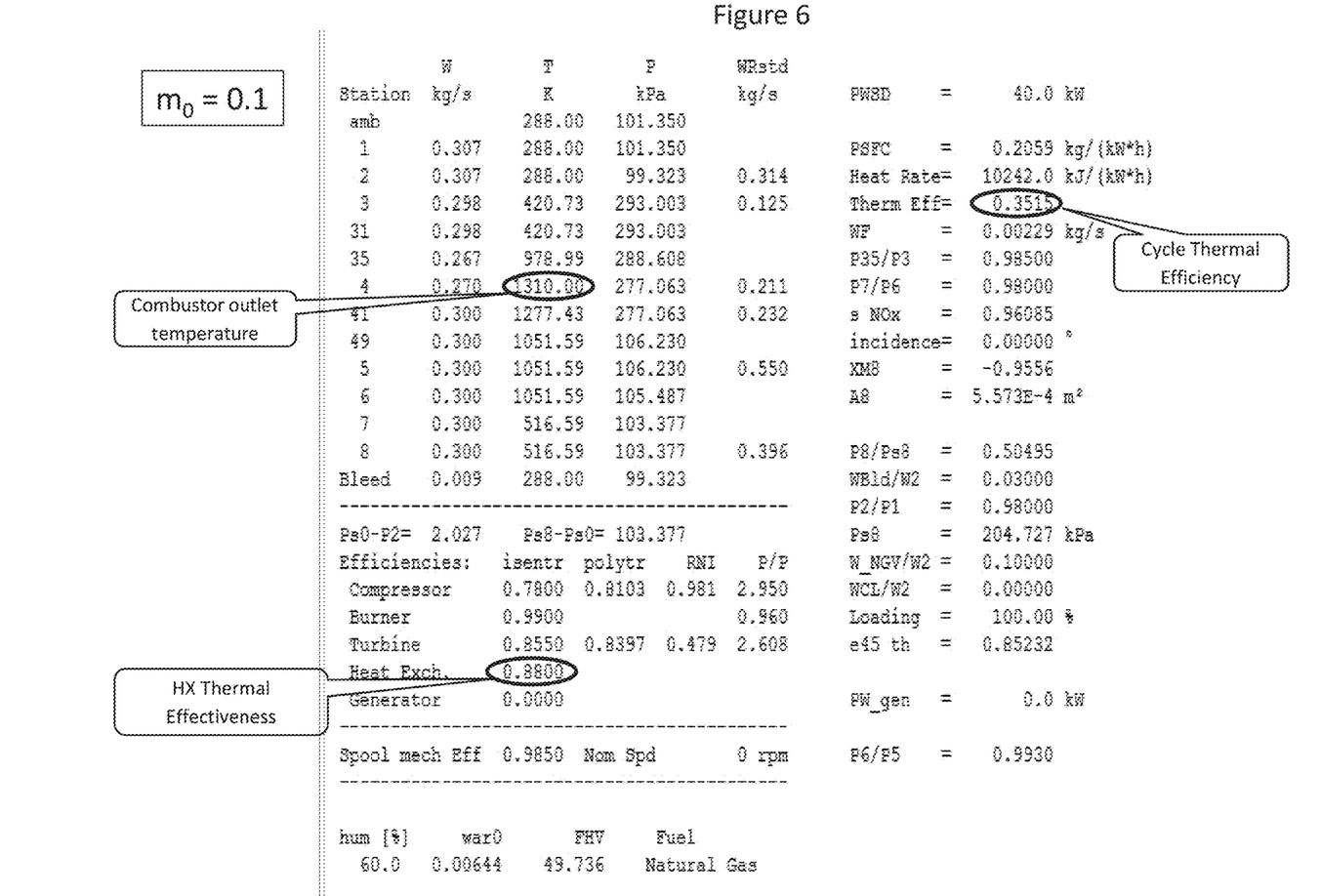
FIG. 6: Thermodynamic results for an exemplary 40 kW gas turbine with a bleed fraction of 0.1.
Figure 7:
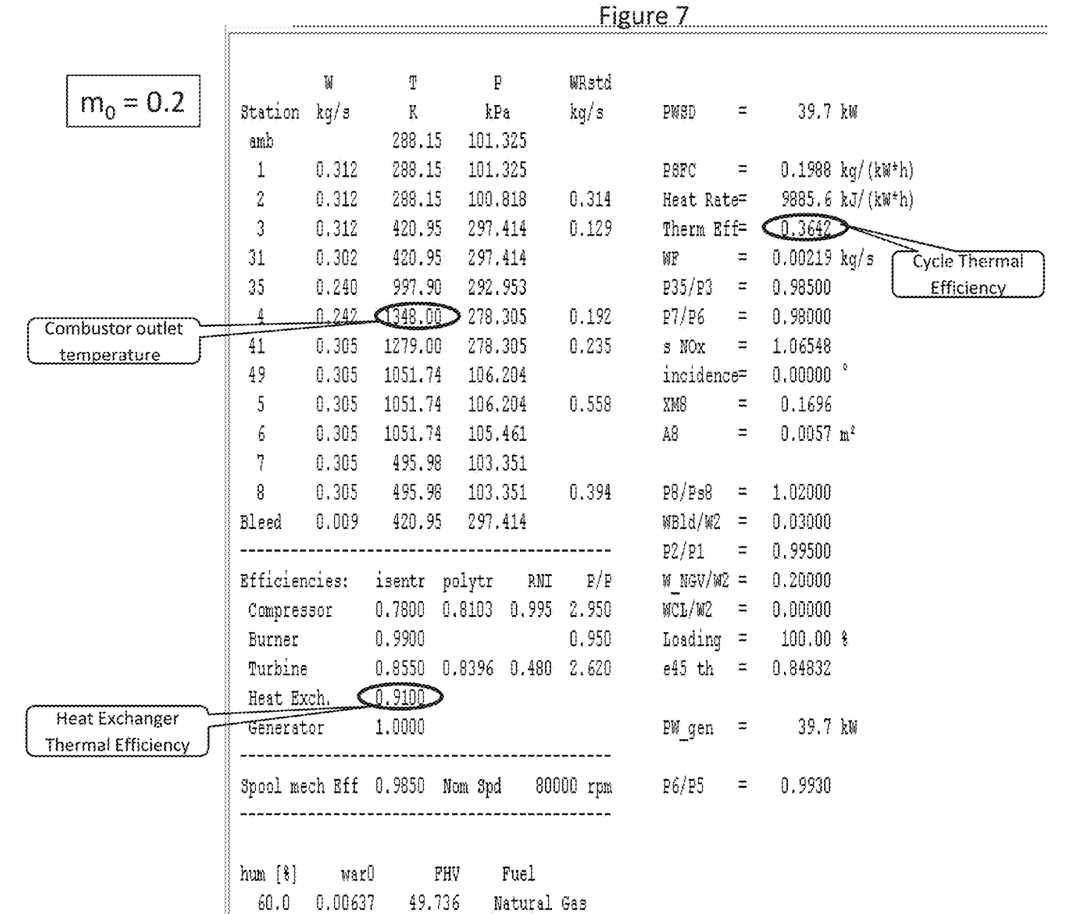
FIG. 7: Thermodynamic results for an exemplary 40 kW gas turbine with a bleed fraction of 0.2.
Figure 8:
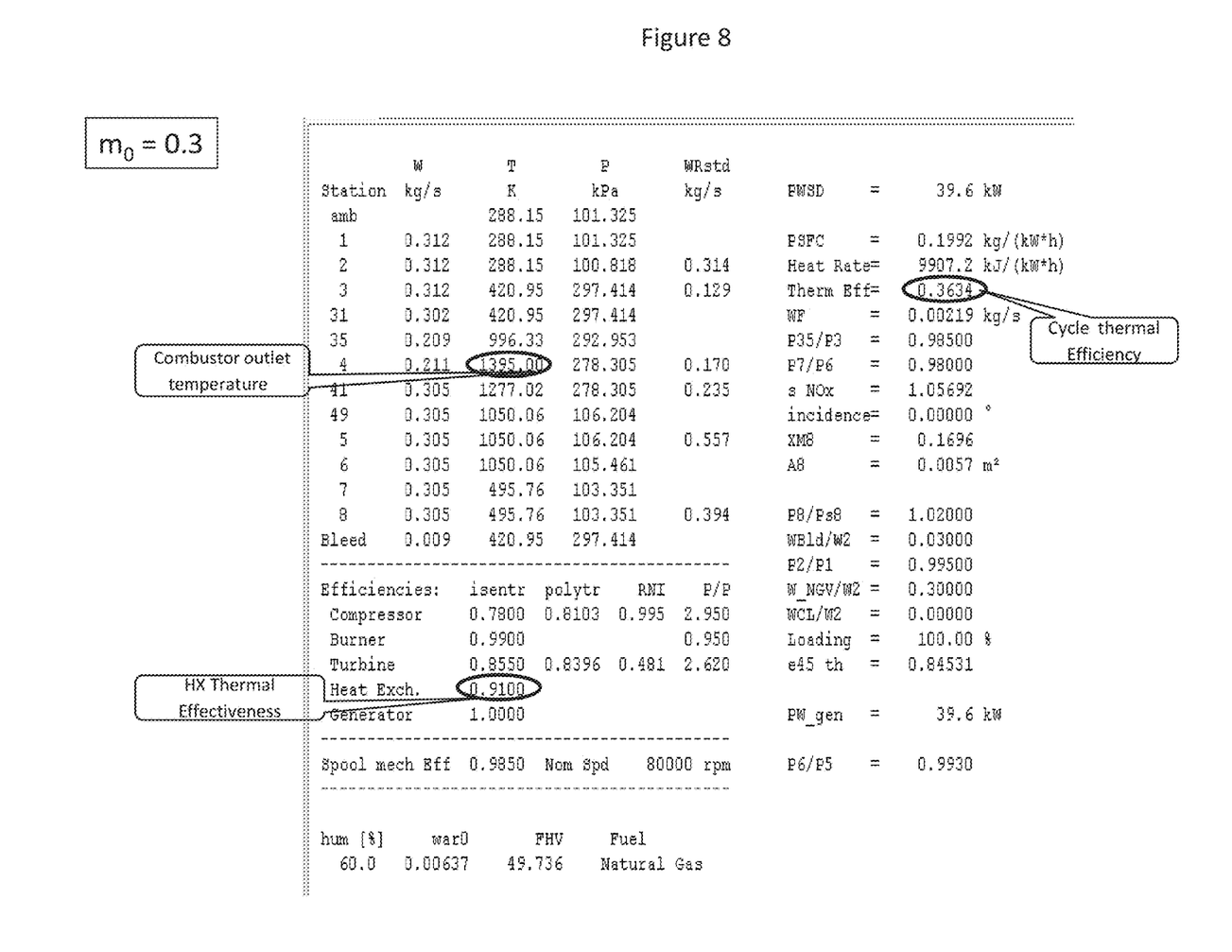
FIG. 8: Thermodynamic results for an exemplary 40 kW gas turbine with a bleed fraction of 0.3.

FIG. 4 is a schematic diagram showing gas turbine station points in an exemplary 40 kW gas turbine according to the present invention. The station point numbers and their locations inside the gas turbine engine are explained in TABLE 1.

TABLE 1

| Station # | Turbine Location |
| --- | --- |
| 2 | Compressor outlet |
| 3 | Compressor inlet |
| 4 | Combustor outlet |
| 5 | Turbine outlet |
| 6 | Recuperator hot inlet |
| 7 | Recuperator hot outlet |
| 8 | Exhaust outlet |
| 31 | Recuperator cold inlet |
| 35 | Recuperator cold outlet |
| 41 | Turbine inlet |
| 49 | Turbine outlet |

Results of exemplary thermodynamic simulations, carried out using GasTurb simulation software developed by Joachim Kurzke and available from GasTurb GmbH (http://www.gasturb.de), are summarized in TABLE 2. In the exemplary simulations, the gas turbine engine provides a nominal output power of 40 kW, and turbine inlet temperature. T4, is approximately 1277 degrees Kelvin (° K). TABLE 2 presents results for values of the bleed fraction, $m_0$, ranging from 0 to 0.3.

TABLE 2

| Bleed fraction $m_0$ | Cycle Efficiency | Heat Exchanger Efficiency | Combustor Outlet Temperature ° K. |
| --- | --- | --- | --- |
| 0 | 32.0% | 83% | 1277 |
| 0.1 | 35.2% | 88% | 1310 |
| 0.2 | 36.4% | 91% | 1348 |
| 0.3 | 36.3% | 91% | 1395 |

Further details of the thermodynamic simulations, corresponding to bleed fractions of $m_0$=0, 0.1, 0.2, and 0.3, are found in FIGS. 5, 6, 7, and 8, respectively. In each figure, the values of the combustor outlet temperature (T3 in FIG. 1), the recuperator HX thermal effectiveness (Eff), and the overall cycle thermal efficiency are indicated.

Referring to Table 2, the cycle and heat exchanger efficiencies increase monotonically with increasing values of $m_0$. Most of the improvement is found in going from $m_0$=0 to $m_0$=0.2, which accounts for an increase in cycle efficiency from 32.0% to 36.4%, which is a relative increase of (36.4−32.0)/32.0=13.8%. The corresponding relative increase in heat exchanger efficiency is (91−83)/83=9.6%. A further increase of $m_0$ from 0.2 to 0.3 does not appear to be worthwhile, as there is no further increase in cycle and heat exchanger efficiencies.

Maintaining constant power increases the combustor outlet temperature to 1348° K at the optimal bleed fraction of $m_0$=0.2. However, after mixing the gas from the combustor with the cooling bleed air, the gas temperature (T4) at the inlet to the turbine drops to 1277° K.

The improved efficiency of the heat exchanger when $m_0$=0.2 is a consequence of a decrease in the hot-to-cold flow ratio. Rhc, in accordance with the graph in FIG. 3. The improved efficiency compensates for energy losses incurred by use of the cooling air.

In addition, the use of compressor bleeding air for cooling obviates the need for an external ventilation system, which would require additional energy input, as well as the need for isolation of the external envelope of the turbine in order to reduce radiation losses.

Although the invention has been described in conjunction with specific embodiments, it is evident that many alternatives, modifications, and variations will be apparent to those skilled in the art. Accordingly, the invention is intended to embrace all such alternatives, modifications, and variations that fall within the spirit and broad scope of this disclosure.

The invention claimed is:

1. A cooling system for cooling hot components of a recuperated gas turbine engine, the cooling system comprising:
   a compressor comprising a compressor outlet;
   a turbine comprising a turbine inlet and a turbine outlet;
   a recuperator heat exchanger;
   a recuperator flow path in fluid communication with the compressor outlet and the recuperator heat exchanger; and
   a bleed flow path in fluid communication with the compressor outlet, the hot components of the recuperated gas turbine engine, and the turbine inlet;

wherein the hot components of the recuperated gas turbine engine comprise a turbine volute in fluid communication with the bleed flow path;

the bleed flow path injects cooling air into a main inlet of the turbine volute; and wherein a ratio of a mass flow in the bleed flow path to a mass flow in the compressor outlet is equal to a bleed fraction which is greater than or equal to zero and less than or equal to one.

2. The cooling system of claim 1 wherein a mass flow in the recuperator flow path is approximately equal to the mass flow in the compressor outlet minus the mass flow in the bleed flow path.

3. The cooling system of claim 1 wherein the bleed fraction is less than or equal to one-half.

4. The cooling system of claim 1 wherein the bleed flow path and/or recuperator heat exchanger are configured to compensate for energy losses incurred by cooling the hot components.

5. The cooling system of claim 1 wherein the bleed flow path and/or recuperator heat exchanger are configured to maintain substantially constant values of cycle efficiency and/or thermal power of the turbine.

6. The cooling system of claim 1 wherein a thermal effectiveness of the recuperator heat exchanger increases with increasing values of the bleed fraction.

7. The cooling system of claim 1 wherein said turbine volute further comprises a cooling insert in fluid communication with the bleed flow path.

8. The cooling system of claim 7 wherein said cooling insert comprises a gap having a width of between 0.5 mm. and 2.0 mm.

* * * * *